No. 820,801. PATENTED MAY 15, 1906.
A. B. LANDIS.
GRINDING MACHINE.
APPLICATION FILED SEPT. 8, 1904.

9 SHEETS—SHEET 1.

Witnesses
Chas. K. Davies
John A. Daly

Abraham B. Landis, Inventor
By E. W. Bradford
Attorney

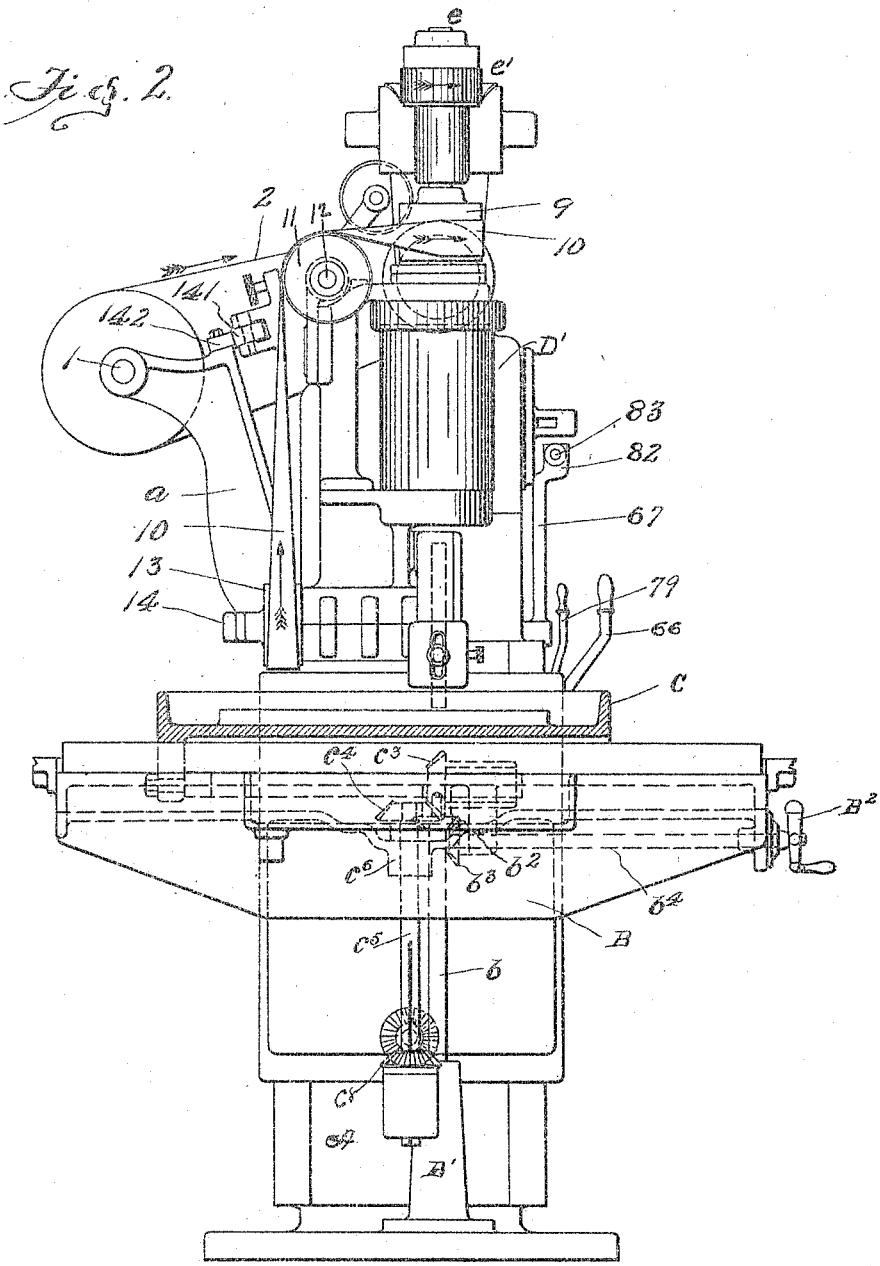

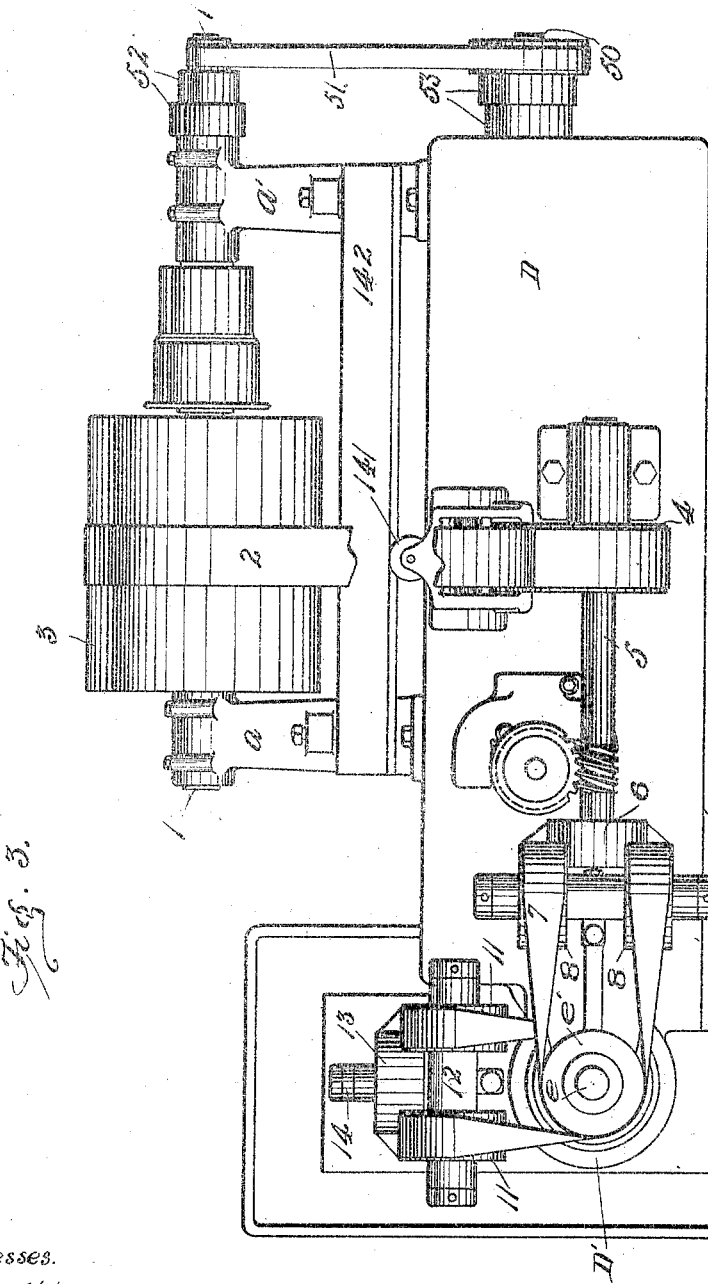

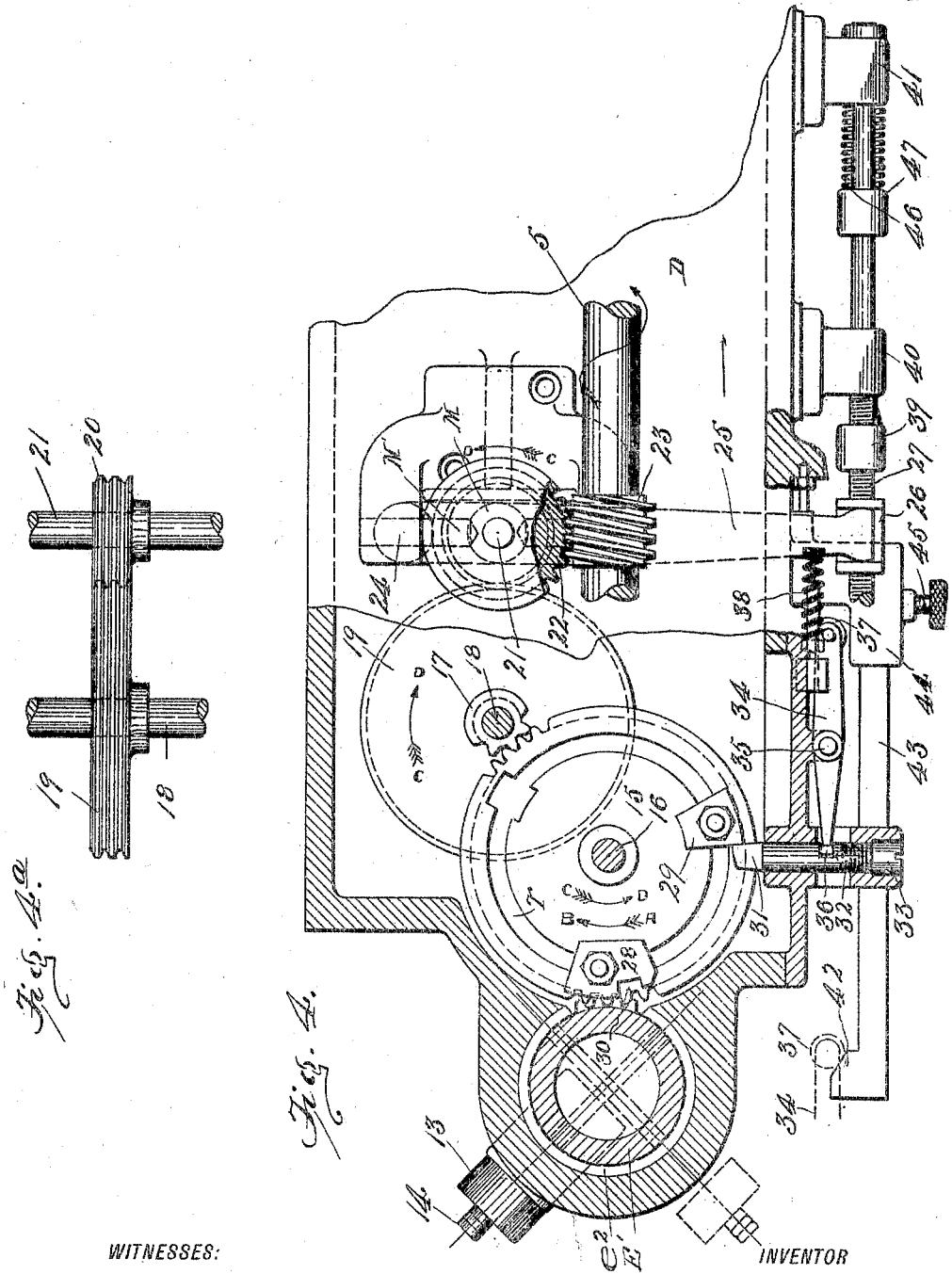

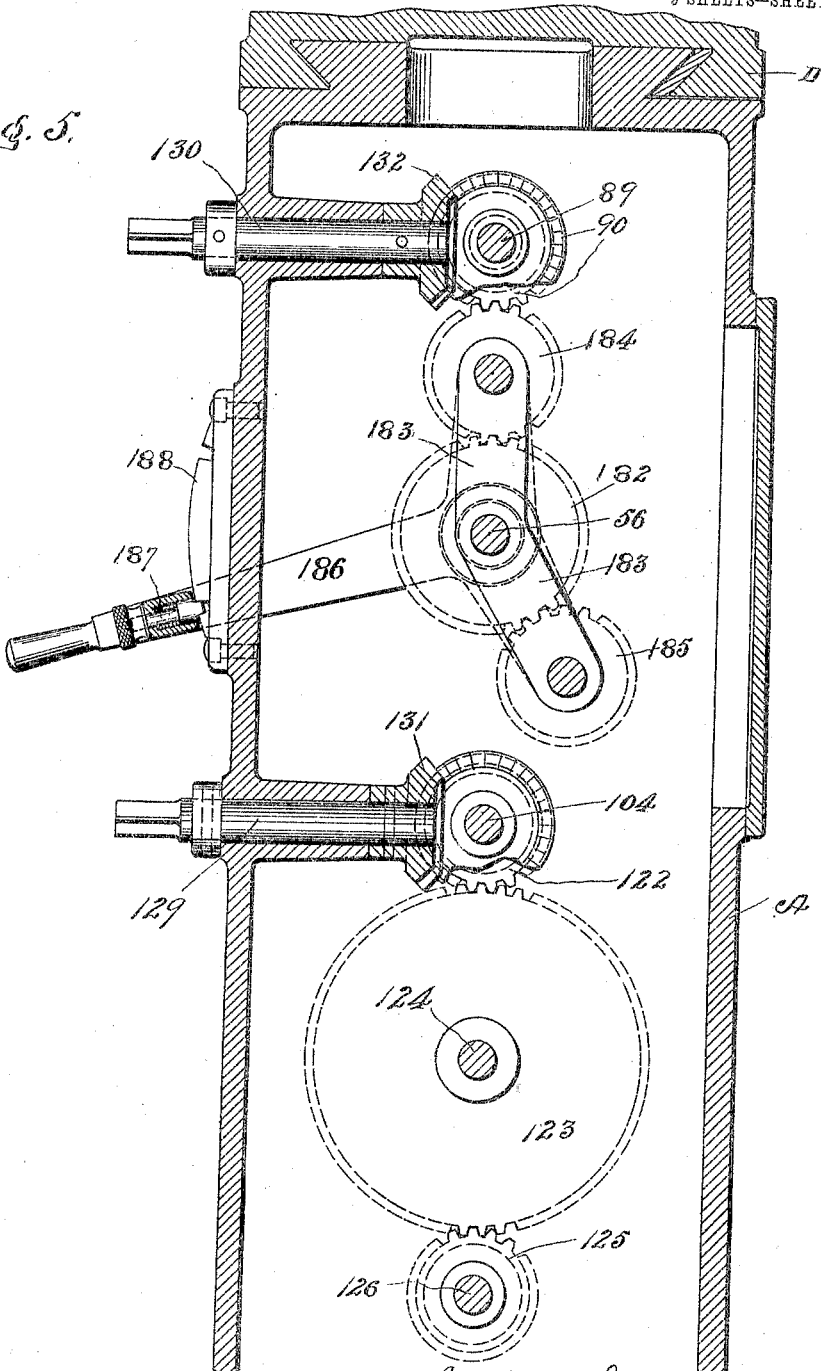

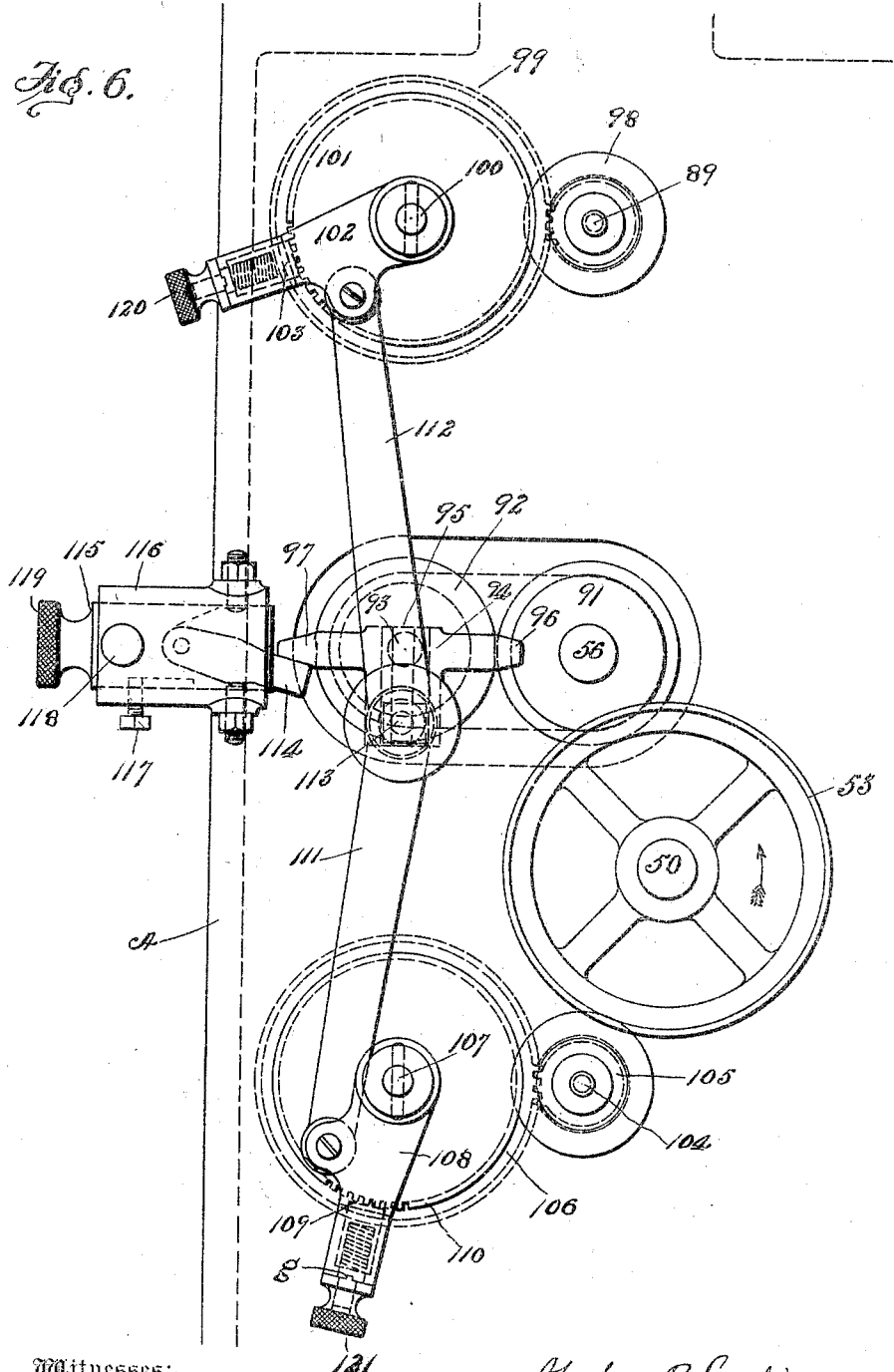

No. 820,801. PATENTED MAY 15, 1906.
A. B. LANDIS.
GRINDING MACHINE.
APPLICATION FILED SEPT. 8, 1904.
9 SHEETS—SHEET 7.
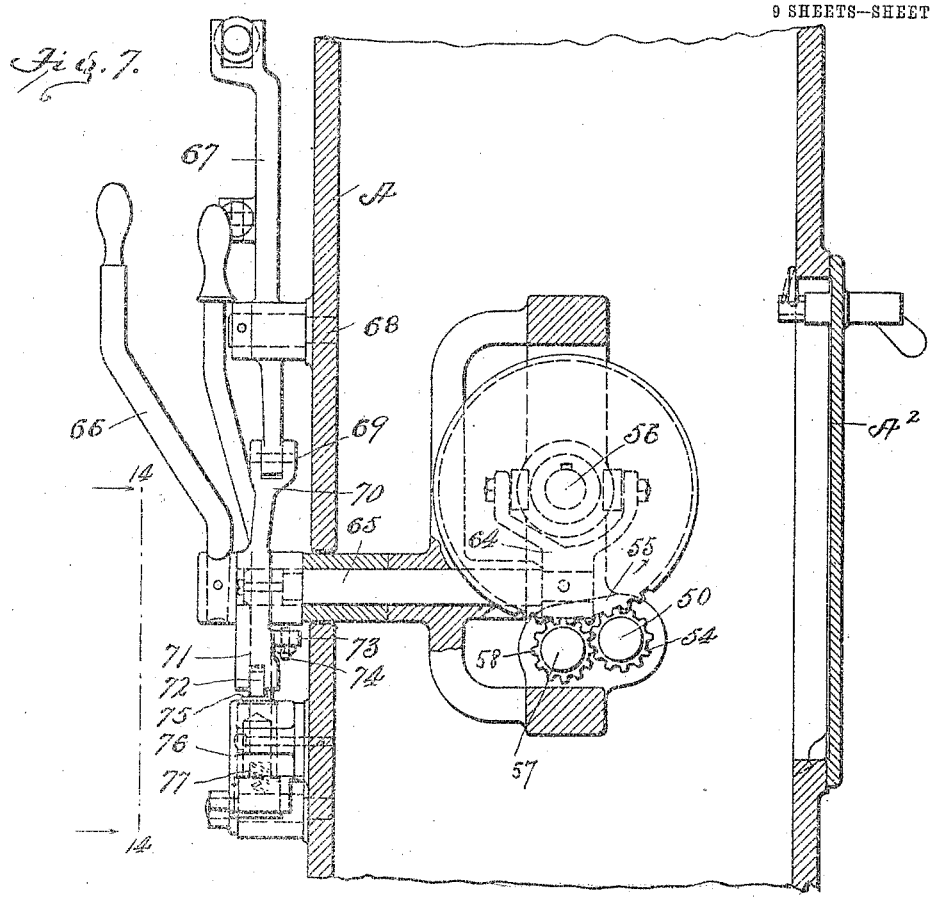
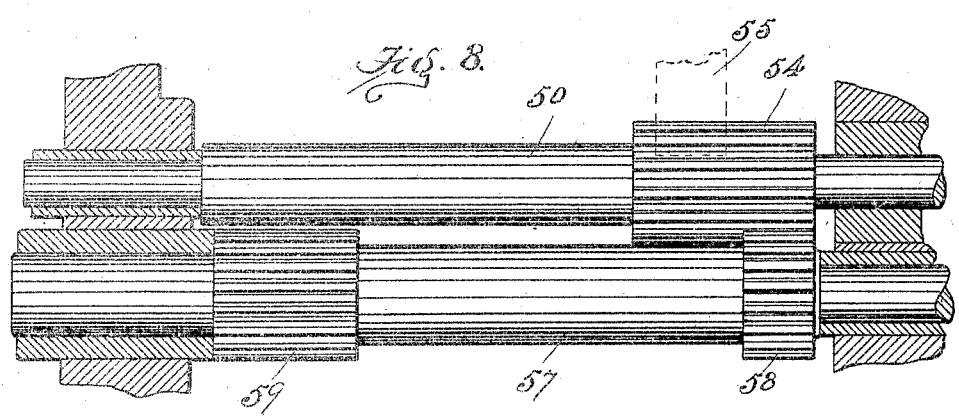
Witnesses:
Chas. K. Davis
John A. Daly
Abraham B. Landis, Inventor
By E. W. Bradford, Attorney No. 820,801. PATENTED MAY 15, 1906.
A. B. LANDIS.
GRINDING MACHINE.
APPLICATION FILED SEPT. 8, 1904.
9 SHEETS—SHEET 8.
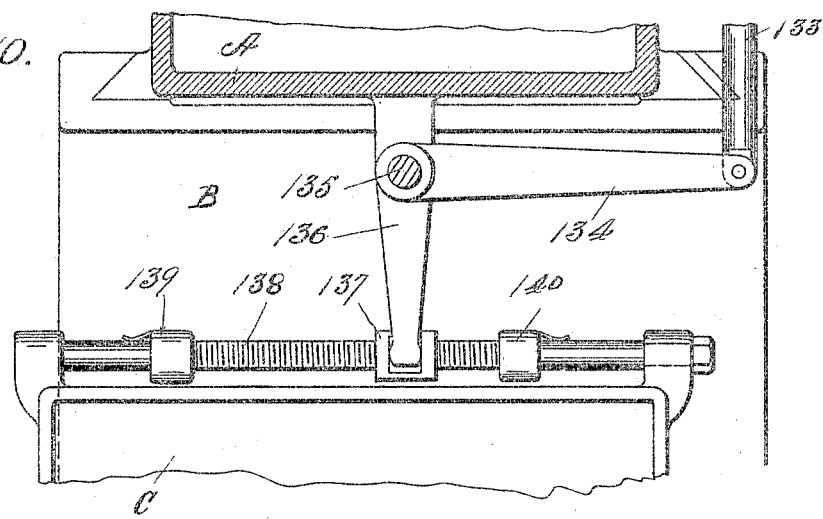
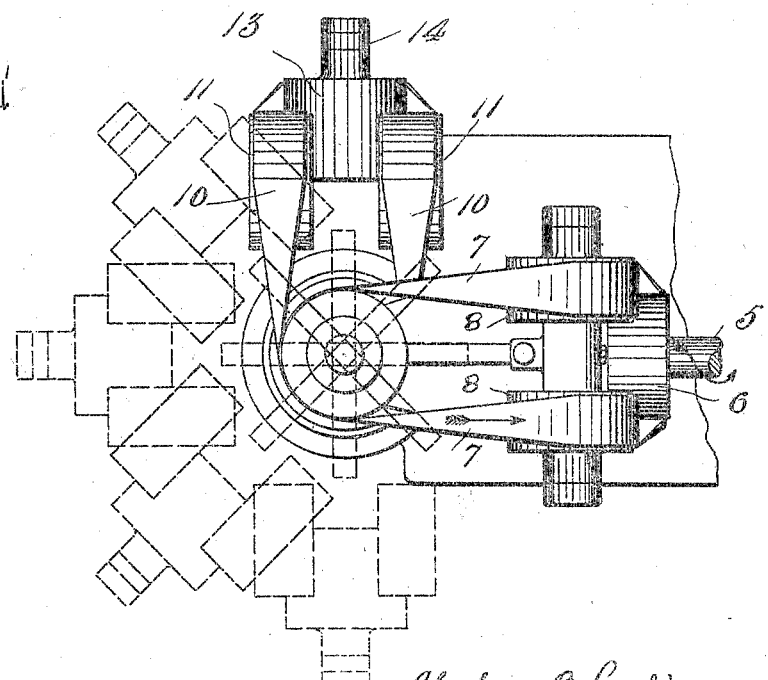

No. 820,801. PATENTED MAY 15, 1906.
A. B. LANDIS.
GRINDING MACHINE.
APPLICATION FILED SEPT. 8, 1904.

9 SHEETS—SHEET 9.

Witnesses:
C. K. Davies
John A. Daly

Inventor
Abraham B. Landis
By G. W. Bradford
Attorney

UNITED STATES PATENT OFFICE.

ABRAHAM B. LANDIS, OF WAYNESBORO, PENNSYLVANIA.

GRINDING-MACHINE.

No. 820,801. Specification of Letters Patent. Patented May 15, 1906.

Application filed September 8, 1904. Serial No. 223,689.

*To all whom it may concern:*

Be it known that I, ABRAHAM B. LANDIS, a citizen of the United States, residing at Waynesboro, in the county of Franklin and State of Pennsylvania, have invented certain new and useful Improvements in Grinding-Machines, of which the following is a specification.

In grinding plain surfaces more rapid progress can be made when the grinding-wheel is presented to the work with its face somewhat at an angle and operated to cut in both directions and so as to cut under against the work at all times.

The object of my said invention is, therefore, to provide a machine wherein the face of the grinding-wheel may be adjusted to stand at an angle to the work and be changed automatically from one position to another at the end of each traverse of the work and the operation of grinding be continued during the traverse of the work in both directions, with the face of the wheel in the same relative position to the work in either direction.

A further object is to provide a machine wherein the work may be fed and the wheel traversed or the wheel fed and the work traversed, as desired.

Said invention consists in various improvements in the construction and arrangement of parts, whereby these objects and their advantages in the operation and results of the machine are secured, all as will be hereinafter more fully described and claimed.

Figure 1:
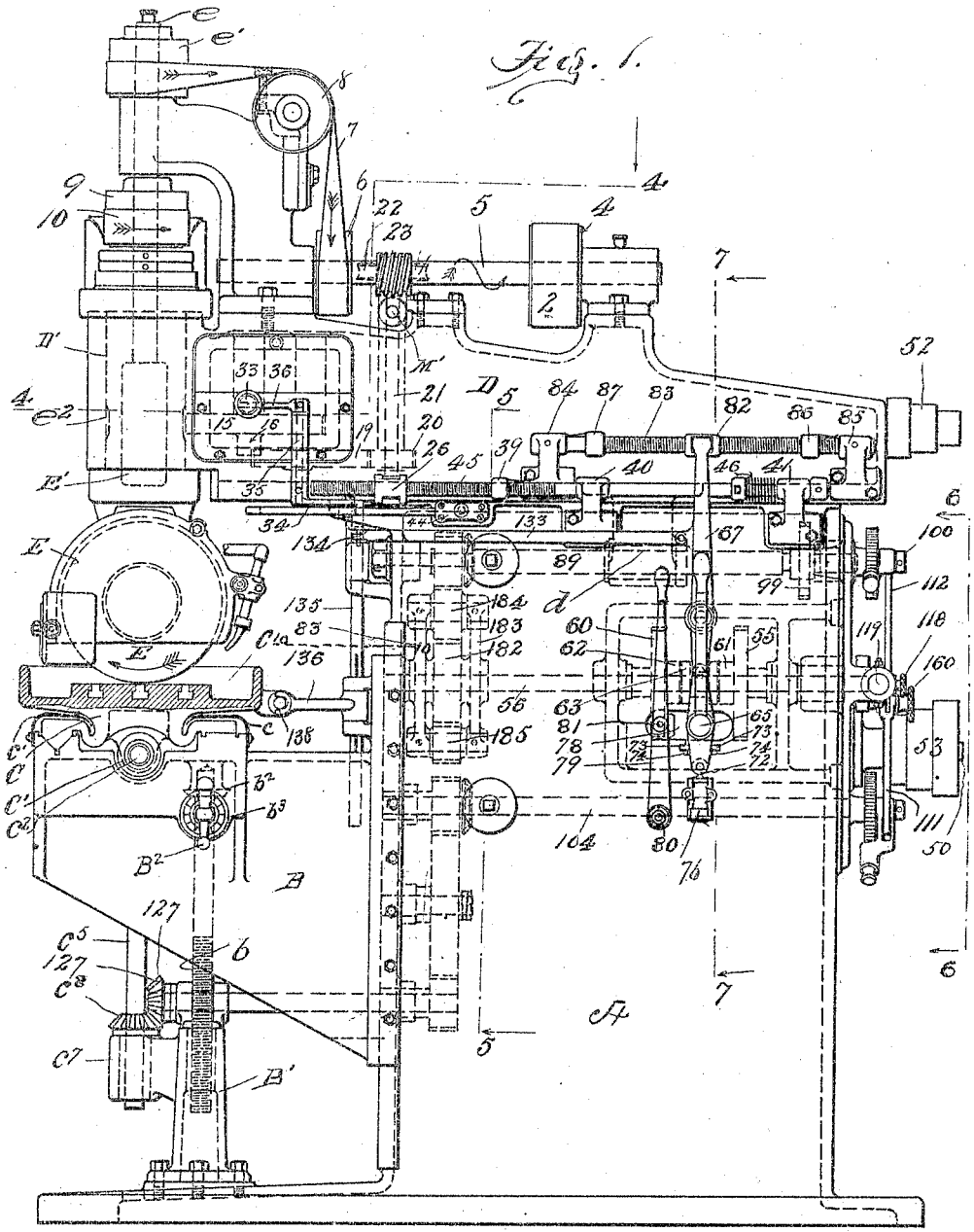
Figure 11:
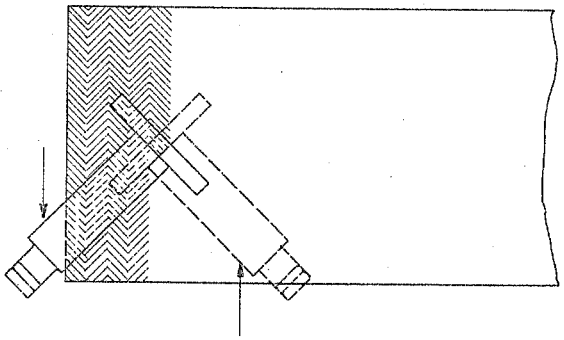
Figure 12:
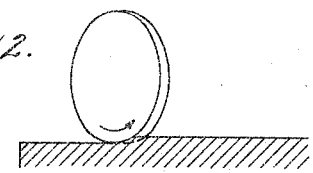
Figure 13:
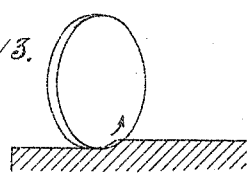
Figure 14:
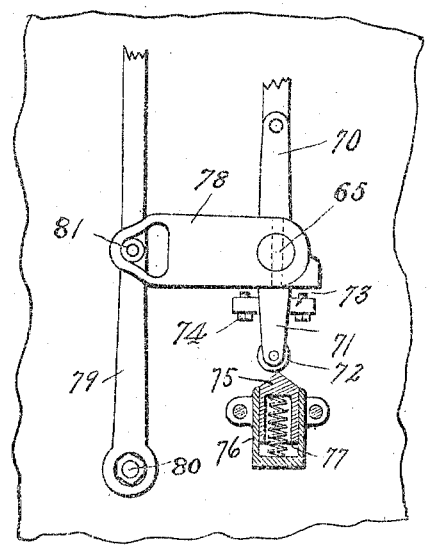

Referring to the accompanying drawings, which are made a part hereof, and on which similar reference characters indicate similar parts, Figure 1 is a front elevation of a grinding-machine embodying my said invention; Fig. 2, a side elevation thereof; Fig. 3, a top or plan view of the grinding-wheel carriage and part of the work-supporting carriage; Fig. 4, a horizontal section looking downwardly from the dotted line 4 4 in Fig. 1; Fig. 4$^a$, a plan view of the friction gear-wheels 19 and 20 connecting the shafts 18 and 21; Fig. 5, a detail sectional view showing the shifting-gear as seen when looking in the direction indicated by the arrows from the dotted line 5 5 in Fig. 1; Fig. 6, a view, on an enlarged scale, of the gear for controlling the feed mechanism as seen when looking toward the machine from the dotted line 6 6 in Fig. 1; Fig. 7, a detail cross-section on the dotted line 7 7 in Fig. 1; Fig. 8, a detail top plan of the shafts forming part of the reversing mechanism illustrated in Fig. 7; Fig. 9, a top or plan view of one end of the grinding-wheel carriage, illustrating the different adjustments in which said wheel may be placed; Fig. 10, a detail view on the dotted line 10 10 in Fig. 1; Figs. 11, 12, and 13, views illustrating the operation of the grinding-wheel upon the work, and Fig. 14 a detail view of the shifting mechanism as seen when looking in the direction indicated by the arrows from the dotted line 14 14 in Fig. 7.

In said drawings the portions marked A represent the bed of the machine; B, the table for supporting the work-carriage; C, said work-carriage, and D the grinding-wheel carriage.

The main frame of bed A of the machine is a casting of suitable form to support the various parts of the machine and is provided with bearings for the various shafts and other parts of the apparatus.

The table B is in the form of a bracket and is mounted upon the edge of base A to slide vertically thereon. The connection between said table and base is as illustrated in Fig. 10 or may be any appropriate connection desired. It is adapted to be supported and adjusted by means of a screw-threaded rod $b$, mounted in a screw-threaded perforation in a standard B', secured to the base beneath said table, as shown. The top of said rod bears in a recess in the under side of said table and is provided with a pinion $b^2$, with which a pinion $b^3$ on the inner end of a shaft $b^4$ engages. Said shaft is mounted transversely in said table and has a crank B$^2$ upon its outer end by which it may be operated by hand. By turning said crank said screw $b$ will be turned and operated to raise or lower said table B to accommodate work of different thicknesses and adjust the work in proper relations to the grinding-wheel, as will be readily understood.

The work-supporting carriage C is mounted in suitable ways upon the top of said table, said ways being provided with protecting-guards $c$ and $c'$, the arrangement being the same as shown in other grinding-machine patents heretofore granted to me. Said carriage is provided with a depending lug C', having a transverse screw-threaded perforation with which the traversing screw $c^2$ engages. Said traversing screw is provided with a pinion $c^3$, which meshes with the pinion $c^4$ on the upper end of a vertical shaft $c^5$, which is supported in a bearing in a suitable bracket $c^6$ on said carriage and in a bearing in a bracket $c^7$, secured to the side of the standard B′, a pinion $c^8$ being mounted thereon by means of a spline connection, as shown in Fig. 2, whereby said shaft is permitted to slide through said pinion and bearing as the table is adjusted up and down. The work is supported on the table C in the usual or any approved manner.

The grinding-wheel carriage D is mounted upon the top of the base A, as shown most clearly in Figs. 1 and 5, being adapted to be moved back and forth upon said top by the mechanism to be presently described. Immediately over the work-carriage is provided a vertical bearing D′, in which is journaled the base E′ of the grinding-wheel E.

The grinding-wheel E is mounted upon a suitable horizontal shaft on the lower end of the vertical cylindrical base E′, which base is journaled in said bearing D′ of the carriage D. In line with the center of said base E′ is journaled a vertical shaft $e$, provided with a pulley $e'$ near its upper end. Said shaft is driven from a main power-shaft 1, journaled in suitable brackets $a$ and $a'$ on the side of the bed, by means of a belt 2, running from a drum 3 on said shaft to a pulley 4 on a shaft 5, mounted upon the top of said carriage. Said shaft 5 is provided with a pulley 6, connected by a belt 7, running over tightening-pulleys 8, with the pulley $e'$ on the top of said shaft $e$. Another pulley 9 is mounted on said shaft $e$ and is connected by a belt 10, running over pulleys 11 on a transverse shaft 12, with the pulley 13 on the grinding-wheel shaft 14. It will thus be seen that said grinding-wheel may be swiveled into any position whatever around the axis of its base E′ without in any manner effecting the driving-gear of said grinding-wheel. The base E′, upon which the grinding-wheel is carried, is cylindrical in form and at a point within the journal-bearing has radial teeth $e^2$, cut therein around its circumference. Said teeth mesh with the teeth of a gear-wheel 15 on a vertical stud-shaft 16, which in turn mesh with the teeth of a pinion 17 on a vertical stud-shaft 18. A friction gear-wheel 19 is mounted on said shaft 18 and engages with a similar friction-wheel 20 near the lower end of a vertical shaft 21, as shown most clearly in Fig. 4$^a$. Said shaft 21 also has a gear-wheel 22, which engages with a worm-gear 23 on the shaft 5. Said shaft 21 is journaled at its lower end in a bearing on an arm 25, pivoted at 24, and at its upper end in a rocking bearing M, mounted on transverse pivots M′. The outer end of said arm 25 is connected to a block 26, perforated and mounted upon the screw-rod 27. The gear-wheel 15 has a circular recess $r$ in its upper face in which are adjustably secured stops 28 and 29. Said stop 28 is provided with a recess or notch 30, adjacent to the periphery of the wheel. A locking-pin 31 is mounted to slide transversely in a suitable socket, being normally held inward by a spring 32, interposed between the outer end of said pin and a screw-cap 33, inserted in the outer end of said socket. A lever-arm 34 is mounted near the lower end of a vertical shaft 35 and another arm 36 is mounted near its top end and engages with a notch in the adjacent side of said locking-pin. The opposite end of arm 34 is forked and has a roller 37 pivoted therein. A spring 38 is mounted between the side of the pivoted bar 25 and a point on the side of the carriage and normally tends to hold said bar so as to release the bearing of friction-wheel 20 against the friction-wheel 19. An adjustable strike 39 is mounted upon screw-rod 27, which screw-rod is carried in brackets 40 and 41 on the side of the bed A. A cam 42 is formed upon the outer end of an arm 43, adjustably mounted, by means of a set-screw 45, in a socket 44 on the side of the bed.

The operation of this grinding-wheel-controlling mechanism is as follows: When it is desired that the grinding-wheel shall be turned at the end of each traverse across the work, so as to present the face thereof to said work at an angle and operate in both directions, as indicated in Fig. 11, the mechanism is set substantially as shown in Fig. 4. The carriage moving in the direction indicated by the arrow when it reaches the end of its traverse the block will come against the strike 39 and operate through arm 25 to press the friction-wheel 20 tightly into engagement with the friction-wheel 19, which will operate said friction-wheel and through the pinion 18 gear-wheel 15 and gear $e^2$ serve to turn said wheel-base from the position shown in whole lines to the position shown in dotted lines in Fig. 4 when the stop 28 on said wheel 15 will have passed to the position so that locking-pin 31 will engage the notch 30 therein and lock said wheel and the grinding-wheel in this position. At the opposite end of the traverse roll 37 on the outer end of lever 34 will contact with cam 42 and operate to withdraw said locking-pin from said notch when the normal strain of the driving-belt, which is running in this direction, will serve to return the parts to the former position, the movement being stopped by the end of the locking-pin 31 coming against the side of stop 29, as shown in Fig. 4, where the parts will be held until forcibly returned to the other position, as before described. A spring 46 is interposed between the bracket 41 and a collar 47 on the screw-rod 27 to permit said rod to slide somewhat through said bracket, so that the connection between the driving-gears 19 and 20 will be of a somewhat yielding character. By the adjustment of strike 39 on the screw-rod 27, stops 28 and 29 on the wheel 15, and the arm 43, having the cam 42 on its outer end, any length of traverse desired may be provided for, as will be readily understood. When it is desired that the grinding-wheel shall set straight across the work, the stop 28 is adjusted to the position on wheel 15 around the circular recess $r$, which will hold the parts in the position desired, and the locking-pin 31 is engaged with the notch 30 therein, and the cam 42 and strike 39 are moved so that they will not be reached by the traveling parts when the wheel is held in the fixed position as long as desired.

The traversing and reversing mechanisms for the carriages C and D are driven from a shaft 50, which is connected by a belt 51 with the shaft 1, a set of pulleys 52 and 53 being provided on said shafts, respectively. Said shaft 50 (see Fig. 7) has a pinion 54, which meshes with a gear-wheel 55 on a shaft 56, mounted in bearings adjacent to and parallel with said shaft 50. An idler-shaft 57 is mounted alongside shaft 50 and has a pinion 58, meshing with pinion 54, and on its opposite end a pinion 59, meshing with a gear-wheel 60 on shaft 56. Said gear-wheels 55 and 60 are normally idle and have clutch parts 61 and 62 on their respective adjacent hubs. A double-faced clutch part 63 is mounted on shaft 56 between them by a spline. A shifting-fork 64 on a transverse shaft 65 with an operating-lever 66 is provided for throwing clutch part 63 into engagement with either clutch part 61 or 62, as desired. This reversing mechanism is substantially the same as that shown and described in my Patent No. 639,900, of December 26, 1899. For automatically operating said reversing mechanism a lever 67 is pivoted to the side of the bed on a stud 69 and connected by a joint 69 to a lever 70, mounted to rock on shaft 65. An arm 71 with a roller 72 in a fork on its lower end is formed on the lower end of said lever, depending beneath the shaft, and has side projections 73, containing adjustable screw-stops 74, which are adapted to contact with the under side of arm 78, thus providing for a slight free motion of said lever. Beneath said roller a double-faced cam 75 is mounted in a socket 76, with a spring 77 adapted to force said cam upwardly against said roller. An arm 78 is rigidly mounted on said shaft 65 and extends at right angles therewith, having a substantially three-sided opening therein of the form best shown in Fig. 14. A lever 79 is pivoted at 80 on the bed and has a roller 81 thereon which engages said opening in said arm 78. The upper end of lever 67 engages a block 82, perforated and mounted to slide on a screw-rod 83, mounted in brackets 84 and 85 on the side of the carriage D. Adjustable trips 86 and 87 are provided on said screw-rod to contact and throw block 82 and the top of lever 67 to operate through the mechanism just described the shifting of the motion of shaft 56 and the travel of the carriages from one direction to the opposite. The arm 78 being rigid on shaft 65 must rock therewith when said shaft is rocked to throw the clutch part 63. This is permitted when roller 81 on lever 79 is in the front end or vertical portion of the opening in arm 78. When it is desired to hold said clutch part 63 on the center between the clutch parts 61 and 62 and out of engagement with both, said lever 79 is drawn back to bring said roller 81 into the horizontal part of said opening in arm 78, thus locking said arm in a horizontal position and holding said clutch part 63 in the desired central position. The lever 70 with its arm 71 being allowed a slight motion free from the shaft 65 by means of the set-screws 74, the spring-cam 75 will always stop on the side of the roller 72 to immediately throw arm 71 and lever 70 to engage the clutch parts to drive the gearing in the same direction it was going when it was stopped by throwing the central clutch part into the center position. It also serves to permit the roller to pass over the point of the cam in shifting before the clutch part 63 entirely frees from the clutch part it is leaving when said spring acts quickly to throw it into opposite clutch part.

On the opposite end of shaft 56 (see particularly Fig. 5) is mounted a gear-wheel 182, and a frame 183 is mounted to rock on said shaft and extends on each side of said gear-wheel 182 to beyond its periphery and has a pinion 184, journaled on a shaft in one end, meshing with one side of gear-wheel 182 and a pinion 185, journaled on a shaft in its opposite end which meshes with the opposite side of said gear-wheel 182. An operating-lever 186 extends outwardly from the frame 183 and has a spring-pawl 187, adapted to engage with notches in the face of a segment 88, mounted on the side of the machine. A screw-threaded shaft 89 is mounted in suitable bearings to extend across the machine under and longitudinally of the carriage D. A depending lug $d$ on the under side of said carriage is perforated and internally screw-threaded, and said screw-shaft 89 passes through and engages therewith. A pinion 90 is mounted on the end of shaft 89, adapted to engage pinion 184. Thus shaft 56 is connected to drive shaft 90 to traverse the grinding-wheel carriage across the work, and at each end of the traverse motion, the stops 86 and 87 being properly set, the clutch part 63 is thrown to engage the opposite driving-wheel 55 or 60 and reverse the motion of said carriage.

On the outer end of shaft 56 is mounted a friction-wheel 91, the face of which is adapted to engage with a friction-wheel 92 on a stud-shaft 93. On the face of said wheel 92 is fixed a plate 94, having a central radial slot 95 and two arms 96 and 97, extending at right angles with said slot and with their ends projecting beyond the periphery of said wheel 92. Near the outer end of shaft 89 is mounted a gear-wheel 98, which meshes with a gear-wheel 99 of larger size on a counter-shaft 100. On the outer end of said shaft is mounted a toothed wheel 101. An arm 102, carrying a spring-mounted pawl 103, is mounted on said shaft 100, with said pawl adapted to engage the teeth of wheel 101. A shaft 104, corresponding to shaft 89, is mounted in bearings an equal distance below shaft 56 and has a gear-wheel 105, which meshes with gear-wheel 106 on a shaft 107, corresponding to shaft 100. An arm 108, having a spring-pawl 109, mounted in a socket in its outer end, is mounted on said shaft 107, with the pawl adapted to engage with the teeth on the periphery of a toothed wheel 110. Arms 102 and 108 are connected to each other at a point distant from the respective shafts by a jointed pitman-rod consisting of the two parts 111 and 112, mounted upon a crank-pin 113, which is adjustably mounted in the groove or way 95 in the plate 94 upon the face of wheel 92. By this means the rotation of wheel 92 operates through the crank formed by the crank-pin 113, fixed at a suitable distance from the center of said wheel 92 by the clamping-pin and nut 162 and the pitmen 111 and 112 and the pawls to feed the wheels 101 and 110 forward and, through the gear connections, operates the shaft 89 and 104, as will be presently described. A hinged adjustable stop 114 is mounted in a suitable socket on the side of the frame adjacent to wheel 92 and in a position adapted to contact with the ends of the arms 96 and 97. Said stop is hinged and mounted in a recess formed as indicated in Fig. 6 to permit said stop to swing up and down by the center, and thus allow a complete half-revolution of wheel 92 at all times. The block 115, in which it is mounted, is adapted to slide back and forth in the housing 116, being limited in its movement by means of a groove in its under side with which a stop-screw 117 engages. It may be locked in the adjusted position by means of a set-screw 118 and is adjusted back and forth by a knob or handle 119. The spring-pawls 103 and 109 have knobs 120 and 121 on their respective ends, by which they may be withdrawn from engagement with the teeth in their respective wheels and given a half-revolution in order to bring the square faces of the pawls to the opposite direction, so as to operate to feed said wheels in the opposite direction when desired, as will be presently described. They are held in proper position by transverse tongues $g$, which engage grooves in the ends of the sockets. They may also be given a quarter-turn, when said tongues will rest outside said grooves and hold the pawls out of engagement with the teeth of their respective wheels when desired. The shaft 104 has a gear-wheel 122 on its inner end which meshes with the gear-wheel 123 on a stud-shaft 124, which in turn meshes with a gear-wheel 125 on a shaft 126, which has a bevel-gear 127 on its opposite end which meshes with the bevel-gear $c^8$ on the vertical shaft $c^5$, and thus provides the means for feeding the work on the work-table C to the grinding-wheel E.

When the gear is connected as shown in Fig. 5, the shaft 56 operates to traverse the grinding-wheel across the work by driving the screw-shaft 89 and reverses at each end of the movement, which can be regulated as desired, as will be understood from the foregoing description, which has fully explained the arrangement and operation of the gearing and mechanism required for this purpose, as well as the mechanism for shifting the angle of the grinding-wheel, so as to present its face to the work at the same angle in both directions and operate upon said work by an undercut during its travel in both directions. Shaft 56, through the friction-wheel 91, will during this adjustment of the mechanism operate, through friction-wheel 92, pitman 111, lever 108, pawl 109, wheel 110, and gear-wheel 106, to operate shaft 104, which, through the connecting-gear above described, feeds the work up to the grinding-wheel. The pawl 103 in lever 102 during this operation is turned so that it will be held out of engagement with its wheel and permit said wheel to run idle. Strike 114 is withdrawn to a position where its end will clear stop 96, but will contact with stop 97, which is somewhat longer than stop 96. This will permit a complete revolution, so that when shaft 56 reverses by the operation of the reversing-gear at the end of the traverse it will again be in position to operate the feed mechanism during the return movement of the carriage. When it is desired to feed the work to the wheel only during one direction of its motion, stop 114 is adjusted to the position shown in Fig. 6, which will contact with both arms 96 and 97 and permit only a half-revolution of wheel 92. Thus when said wheel 92 has made a half-revolution it is held in this position until shaft 56 reverses, when it travels back to its initial position, with the pawl 109 slipping over the cogs in the wheel 110, and thus not operating said work-feeding mechanism. There is sufficient friction between the wheels 91 and 92 so that the mechanism will be driven when not held by the stops, but at the same time will permit said wheels to slip one upon the other readily when they are so held. Wheel 92 is preferably slightly flattened at the point adjacent to the stops 96 and 97, so as to permit the free slipping of said wheels at these points, the contact being one sufficient to start wheel 92 in motion before any strain is thrown upon the mechanism operated thereby.

When it is desired to feed the grinding-wheel and traverse the work, the frame 183, carrying the pinions 184 and 185, is thrown, by means of the lever 186, so that the spring-pawl 187 will engage in the notch at the upper end of segment 88, which will throw gear-wheel 184 out of engagement with wheel 90 and gear-wheel 185 into engagement with the gear-wheel 122, and thus connect shaft 56 directly with shaft 104, which then operates to traverse the work back and forth exactly as shaft 89 has before operated to traverse the grinding-wheel and, through the mechanism shown in Fig. 6, operates to feed the grinding-wheel up to the work as it traverses back and forth through pitman 112, pawl 103, and the gear connections with the shaft 89, exactly as above described when the other gear is in connection, as will be readily understood.

Short stud-shafts 129 and 130, having squared outer ends for the application of the crank, are provided for adjusting shafts 89 and 104 by hand when desired. They are provided with bevel gear-wheels 131 and 132 on their inner ends, respectively, which mesh with suitable bevel gear-wheels on said shafts 89 and 104.

When the gear is arranged to traverse the work-table C, the shifting mechanism is operated through a rod 133, pivoted to lever 67 at one end and to one end of an arm 134 at the other end, said arm 134 being mounted on the upper end of a vertical rock-shaft 135, mounted in bearings on the side of the frame and having an arm 136 connected therewith by a spline in line with the edge of the carriage C. Said arm 136 has a block 137 on its outer end perforated and adapted to slide over a screw-threaded shaft 138, mounted on the side of said carriage C. Trips 139 and 140 are adjustably mounted on said screw-threaded rod for throwing said lever 136 at the end of the traverse in each direction and through said parts operating the lever 67 to change the direction of the travel, as will be readily understood.

The belt 2, running from the drum 3 to the pulley 4, will have a tendency to cramp carriage D upon its ways. To obviate this, I have interposed an antifriction-roller 141 between said carriage and a track 142 on the brackets supporting the main shaft 1 and drum 3. By this means a free movement is permitted and the thrust taken up without binding said carriage upon its ways. By this arrangement a machine is provided in which the grinding-wheel may be used to the best advantage in grinding the work in both directions across its surface. The grinding-wheel being presented at an angle to the work, as indicated in Fig. 11, and the grinding-wheel being capable of various adjustments, the mechanism shown most clearly in Fig. 4 and indicated in Fig. 9 will result in more rapid work and very quickly cut down the surface to be ground. When it is desired to smooth off the work after the principal reduction is made, it can be done by shifting the grinding-wheel to a straight position and adjusting the controlling device to hold it in said position, as above described. The mechanism shown and described also enables either the wheel to be fed and the work traversed or the wheel traversed and the work fed, as may be most advantageous in the particular character of work being done. It also enables the grinding-wheel to operate either when traversing in one direction or in both directions and the feed to be regulated accordingly.

Having thus fully described my said invention, what I claim as new, and desire to secure by Letters Patent, is—

1. A grinding-machine comprising a grinding-wheel mounted upon a swiveled base, mechanism for turning said base automatically to present the face of said grinding-wheel to the work at different angles and reverse said angle automatically at each end of the work, a work-supporting carriage, and mechanism for operating the same, substantially as set forth.

2. In a grinding-machine, the combination of the grinding-wheel mounted upon a swiveled base, driving mechanism, mechanism for adjusting said grinding-wheel to any angle desired and automatically reversing said angle at the end of the traverse, a work-supporting carriage, and operating mechanism connected therewith, substantially as set forth.

3. In a grinding-machine, the combination of the grinding-wheel mounted upon a base swiveled in a traveling carriage, said carriage, the grinding-wheel shaft, a shaft in line with the swiveled base, a pulley on said shaft, a driving-shaft on the top of said carriage, a belt running from said driving-shaft over a horizontal idler to the pulley on said vertical shaft, another pulley on said vertical shaft, and a belt running from said pulley over another horizontal idler to the pulley on said grinding-wheel shaft, whereby said grinding-wheel may be swiveled as desired without interfering with the driving mechanism, substantially as set forth.

4. In a grinding-machine, the combination of the grinding-wheel carriage mounted to traverse across the top of the main base or frame, mechanism for traversing the same back and forth, a vertical bearing in the outer end of said carriage, the grinding-wheel mounted on a base swiveled in said bearing, driving mechanism, the work-supporting carriage and feeding mechanism therefor, substantially as set forth.

5. In a grinding-machine, the combination of the grinding-wheel carriage, a driving-shaft on the top thereof, the grinding-wheel mounted on a base swiveled in a bearing on said carriage, a driving mechanism, and mechanism for shifting the angle of said grinding-wheel automatically, comprising a gear on said base, a gear-wheel engaging therewith and having adjustable stops thereon, a locking device for engaging said stops, means for driving said wheel, means for releasing said locking device, and trips for operating said mechanism at each end of the traverse of the carriage, substantially as set forth.

6. In a grinding-machine, the combination of the grinding-wheel carriage, a grinding-wheel mounted on a base swiveled in a suitable bearing on one end of said carriage, a gear around said base, a gear-wheel engaging therewith and mounted on a stud-shaft on said carriage, adjustable stops mounted on the face of said gear-wheel, a locking-pin adapted to engage said stops and hold said wheel and grinding-wheel base in fixed positions, another gear connected with said gear-wheel and adapted to be driven by frictional contact with another gear thrown into contact therewith at the end of the travel of said carriage in one direction, and means for adjusting and operating said several parts, substantially as set forth.

7. In a grinding-machine, the combination of the grinding-wheel carriage, the grinding-wheel mounted upon a base swiveled in a bearing on one end of said carriage, a gear-wheel mounted on said carriage and engaging with a gear on the base of said grinding-wheel, adjustable stops on the face of said gear-wheel, means for driving the same intermittingly, a lock-pin for engaging said stops, and a cam and lever for throwing said locking-pin out of engagement therewith, substantially as set forth.

8. In a grinding-machine, the combination of the base, the grinding-wheel carriage mounted to slide thereon, the work-supporting table, the work-carriage mounted to slide on said table, a grinding-wheel carried by said grinding-wheel carriage, mechanism for traversing said grinding-wheel carriage, mechanism for traversing said work-supporting carriage, a reversing-gear connected with the driving-shaft for automatically reversing the direction of said shaft at the end of each traverse, a pawl-and-pitman connection between said driving-shaft and the shafts for operating the gear which drives the two carriages, through which either one of said shafts may be operated to feed either carriage as the other is traversed back and forth across its support, substantially as set forth.

9. In a grinding-machine, the combination of the base, the grinding-wheel carriage mounted thereon, mechanism for traversing said carriage back and forth, the work-supporting table, the work-carrying carriage mounted thereon, mechanism for traversing said carriage, a driving-shaft through which both mechanisms are operated, a shifting mechanism for reversing the motion of said shaft as desired, and a step-by-step-feeding mechanism connecting said driving-shaft with one or the other of said operating-shafts, substantially as set forth.

10. In a grinding-machine, the combination of the base, a grinding-wheel carriage mounted thereon, mechanism for moving said carriage back and forth, a grinding-wheel thereon, means for driving the same, the work-supporting carriage, mechanism for moving said carriage back and forth, a common driving-shaft for both sets of mechanism, and gearing arranged to move one of said carriages by a feeding motion while the other is moved by a traversing motion, substantially as set forth.

11. In a grinding-machine, the combination of the base, the grinding-wheel carriage mounted to slide thereon, the grinding-wheel on said carriage, mechanism for moving said carriage back and forth, the work-supporting carriage, mechanism for moving the same back and forth, means for driving one of said carriages to feed while the other is driven to traverse, and mechanism for changing the feeding and traversing motion from one carriage to the other, substantially as set forth.

12. In a grinding-machine, the combination of the base, the grinding-wheel carriage thereon, the grinding-wheel on said carriage, mechanism for moving said carriage back and forth, mechanism for adjusting and holding the grinding-wheel in relation to the work, a work-supporting carriage, mechanism for moving the same back and forth, a common driving-shaft for said two carriages, a feeding-gear for connecting said driving-shaft with the operating mechanism of one of said carriages, traversing-gear for connecting said driving-shaft with the operating mechanism of the other carriage, and means for reversing the engagement of said gears whereby either carriage may be fed or traversed, substantially as set forth.

13. In a grinding-machine, the combination of the base, the carriage supporting the grinding-wheel mounted thereon, mechanism for moving the same back and forth, the work-supporting carriage, mechanism for moving the same back and forth, a common driving-shaft, shifting-gear for reversing the motion of said shaft, gearing adapted to connect said driving-shaft with either of the operating-shafts of said two carriages, and other gearing connecting said operating-shaft, through the shaft to which it is geared with the other shaft to operate it to feed the carriage with which it is connected while the other carriage is traversing, substantially as set forth.

14. In a grinding-machine, the combination of the base, a grinding-wheel swiveled in a suitable bearing in its carriage, said carriage mounted on said base, means for adjusting said grinding-wheel at an angle with the work, means for reversing said angle at the end of each traverse, and means for throwing said mechanism out of gear and locking said wheel in a fixed position, substantially as set forth.

15. A grinding-machine having a grinding-wheel adapted to grind in both directions across the work and provided with two carriages, one of which carries the work and the other of which carries the grinding-wheel, and mechanism for feeding one and traversing the other, said mechanism being arranged to traverse either carriage and feed either carriage, one being fed while the other is traversed, substantially as set forth.

In witness whereof I have hereunto set my hand and seal, at Washington, District of Columbia, this 6th day of September, A. D. 1904.

ABRAHAM B. LANDIS. [L. S.]

Witnesses:
MARY A. WILSON,
E. W. BRADFORD.